(No Model.)
J. DANZ, Jr.
DECOY.
No. 282,851. Patented Aug. 7, 1883.
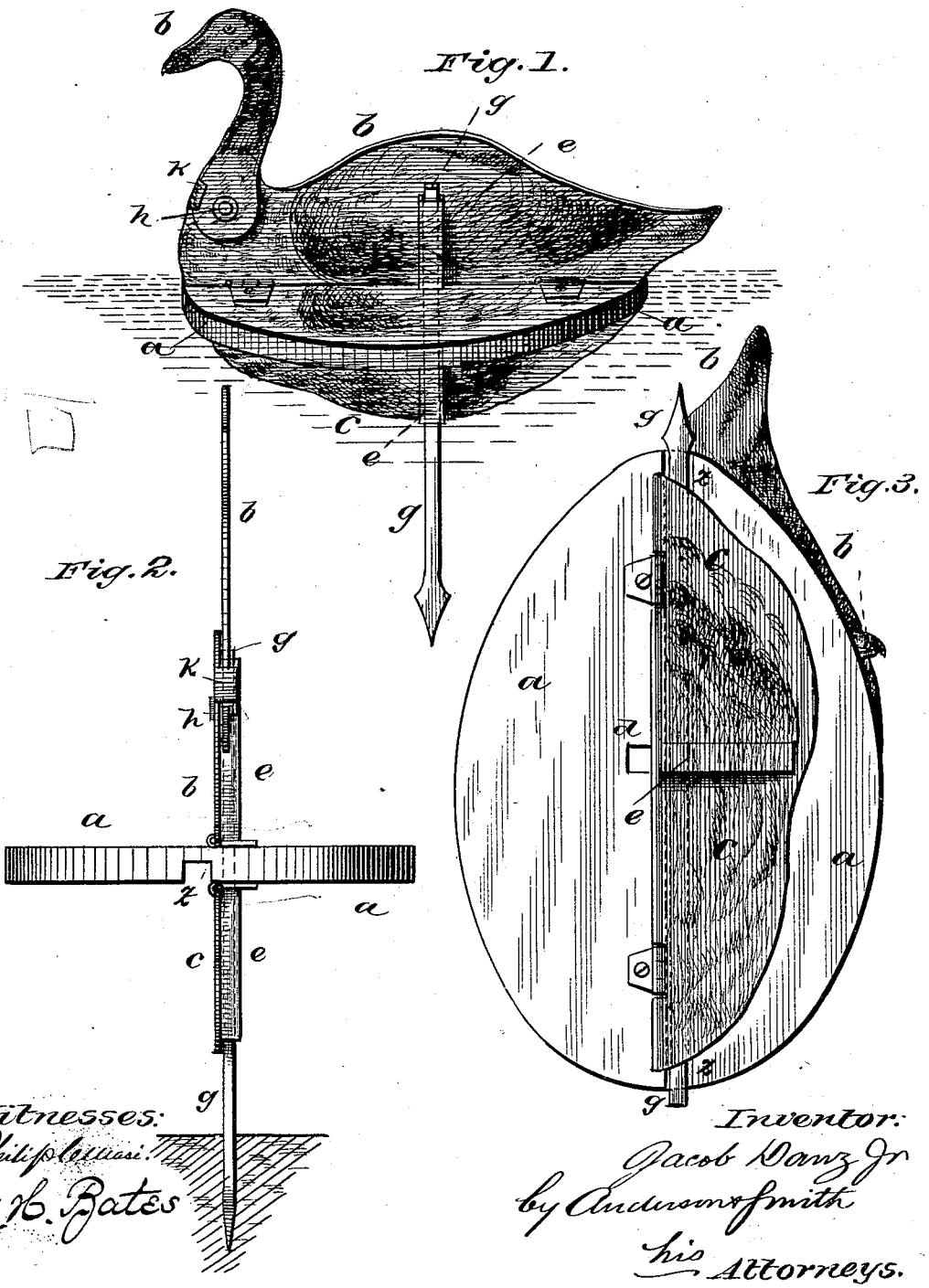
Witnesses:
Philip Louisi
E. H. Bates
Inventor:
Jacob Danz Jr
by Anderson & Smith
his Attorneys.

UNITED STATES PATENT OFFICE.

JACOB DANZ, JR., OF ST. PAUL, MINNESOTA.

DECOY.

SPECIFICATION forming part of Letters Patent No. 282,851, dated August 7, 1883.

Application filed April 3, 1883. (No model.)

*To all whom it may concern:*

Be it known that I, JACOB DANZ, Jr., a citizen of the United States, residing at St. Paul, in the county of Ramsey and State of Minnesota, have invented certain new and useful Improvements in Decoys; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a perspective view of my decoy. Fig. 2 is an edge view, and Fig. 3 is a bottom view folded.

This invention has relation to decoys for sportsmen's use; and it consists in the construction and novel arrangement of parts, as will be hereinafter fully described, and particularly pointed out in the claims appended.

In the accompanying drawings, the letter $a$ designates the float; $b$, the upper profile, and $c$ the lower or keel profile. The float is made flat, its upper and lower surfaces being parallel with each other. It may be conveniently constructed of a piece of board or other light material. The upper surface of the float is designed to be painted to represent the back of the goose or other fowl. When the decoy is made reversible, both surfaces should be so painted, representing the backs of different kinds of fowls.

$b$ represents the upper profile, which is painted to represent the upper portion of a duck, goose, or other fowl, as the case may be. This profile is designed to be hinged or otherwise connected to the top of the float, so that it may be folded down thereon or raised in a plane at right angles thereto. The lower profile, $c$, is connected to the other side of the float, and serves, when the decoy is floating on the water, as a keel to steady the same and prevent it from being overturned. When used on land, the lower profile, $c$, serves to fill out the form of the fowl, it being then entirely exposed. The lower profile, $c$, is also designed to fold closely against the float $a$, for convenience in packing when the decoy is not in use. In order to hold the profile or profiles of the decoy firmly in raised position with relation to the float, each profile is provided with a socket-bearing, $e$, and the float with an aperture, $d$, and a rod or stake, $g$, preferably of metal, is passed through the bearings and aperture, and serves to hold the parts securely in relative position. The lower end of the stake-fastening is usually extended and pointed at its end, so that it may be easily forced into the ground when the decoy is used on land. The head and neck portion of the profile is designed, usually, to be pivoted to the body portion, as indicated at $h$, so that it can be turned back against the side of the body portion for convenience and protection in packing. A stop, $k$, serves to hold the neck in proper position when raised. When a reversible decoy is desired, the lower or keel profile may consist of the profile of the upper portion of a fowl of different kind. When so used, the lower profile should have the head and neck portion bent back under the float. In order to reverse the decoy, the head and neck portion of the upper profile is folded back, while that portion of the lower profile is raised, the stake is reversed in the bearings, if necessary, and the decoy is turned upside down. In this manner a single decoy may be made to represent either a goose or a brant, or a canvas-back duck and a mallard.

In the construction of these decoys the profiles are preferably made of sheet metal; but water-proof pasteboard or other light water-proof material may be employed. A groove, $z$, may be made lengthwise in the float to receive the stake when the decoy is packed for storage or transportation.

Having described this invention, what I claim, and desire to secure by Letters Patent, is—

1. A decoy having in connection with a float an upper folding profile and a lower folding profile or keel, substantially as specified.

2. A decoy having, in combination with a flat float, upper and lower profiles connected thereto, and a rod or stake fastening, substantially as specified.

3. The combination, with the float and the rod-fastening, of two profiles, respectively connected to the upper and under sides of the float, and representing different kinds of wild fowl, substantially as specified.

4. In a decoy, the profile $b$, having the pivoted head and neck portion, and a stop to hold the neck in proper position when raised.

5. A folding decoy, consisting of the flat float having the folding upper and lower profiles, the groove $z$, and the rod-fastening, substantially as specified.

In testimony whereof I affix my signature in presence of two witnesses.

JACOB DANZ, JR.

Witnesses:
J. O. VERVAIS,
FRANK O. OLIVER.